United States Patent

Schaefer

[15] 3,680,704
[45] Aug. 1, 1972

[54] OZONE SEWAGE TREATMENT APPARATUS

[72] Inventor: Richard J. Schaefer, 16852 Murray Hill Ave., Detroit, Mich. 48235

[22] Filed: March 11, 1971

[21] Appl. No.: 123,157

[52] U.S. Cl. .................. 210/218, 210/170, 210/220
[51] Int. Cl. .......................................... C02c 1/12
[58] Field of Search ........ 210/63, 170, 220, 221, 203, 210/192, 218, 532

[56] References Cited

UNITED STATES PATENTS

| 848,279 | 3/1907 | Ashley | 210/170 X |
| 1,950,841 | 3/1934 | Crawford | 210/170 X |
| 2,050,771 | 8/1936 | Wait | 210/192 |

FOREIGN PATENTS OR APPLICATIONS 552,895  2/1958  Canada........................210/170

Primary Examiner—J. L. De Cesare
Attorney—Barnes, Kisselle, Raisch & Choate

[57] ABSTRACT

An apparatus for secondary treatment of sewage effluent with an ozone contact chamber connected to a tile field with a vent to the atmosphere at a point remote from the connection to the chamber. A generator produces ozone in compressed air which is discharged into sewage effluent in the chamber and passes through the tile field and vent to the atmosphere to treat the sewage effluent in both the chamber and the tile field.

7 Claims, 2 Drawing Figures

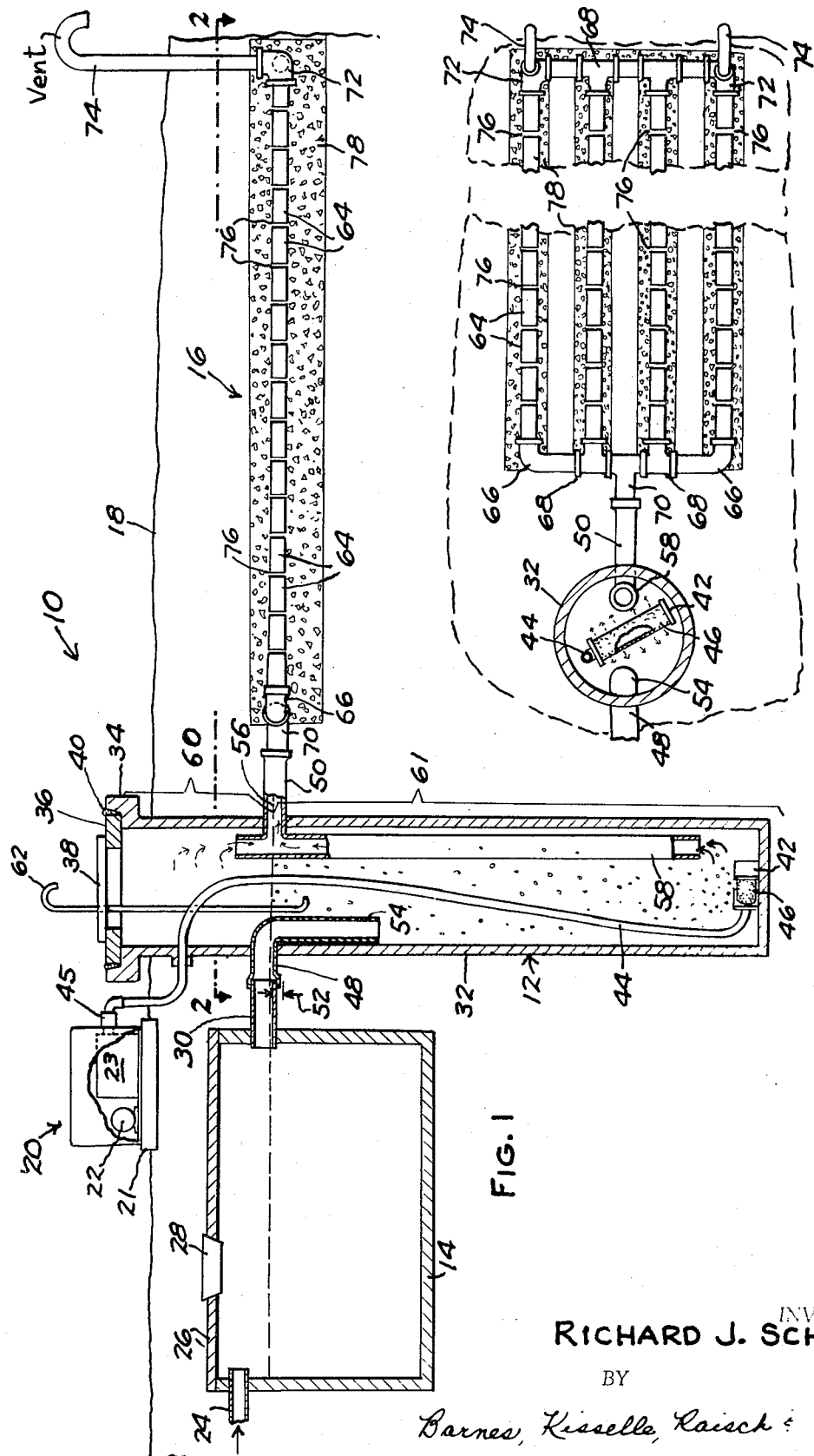

OZONE SEWAGE TREATMENT APPARATUS

This invention relates to the treatment of sewage or excreted waste products of a living organism and organic refuse and more particularly to an apparatus for secondary treatment of sewage effluent. Sewage is generally treated by the use of anaerobic bacteria and aerobic organisms to attack and reduce the sewage and also by oxidation to destroy bacteria in and reduce the sewage. Anaerobic bacteria are active only in the absence of free oxygen or air containing oxygen, and aerobic organisms are active only in the presence of free oxygen or air containing oxygen.

The conventional septic tank and conventional tile field use anaerobic bacteria to reduce sewage, and aerator devices use aerobic organisms to decompose sewage. Tanks in which sewage effluent from a septic tank or aerator is brought in contact with ozone have also been used to reduce the sewage effluent by oxidation. Ozone is an unstable molecule of three oxygen atoms instead of the usual two atoms of atmospheric oxygen.

Objects of this invention are to provide a secondary treatment apparatus for sewage effluent which eliminates offensive odors, increases the useful life of a sewage effluent tile field system, increases the capacity of a previously installed or reduces the required size of a new sewage effluent tile field system compared to a conventional tile field system, and which is relatively service and maintenance free compared to conventional septic tank and tile field systems.

These and other objects, features and advantages of this invention will be apparent from the following description and accompanying drawing in which:

FIG. 1 is a side view in section of a sewage treatment apparatus embodying the present invention.

FIG. 2 is a fragmentary sectional view on line 2—2 of FIG. 1.

Referring to the drawing:

FIG. 1 illustrates a sewage treatment apparatus 10 constructed in accordance with this invention with a contact chamber 12 connected to the outlet of a conventional septic tank 14 and the inlet of a tile field 16 installed in soil 18. Septic tank 14 provides the primary treatment of the sewage, and contact chamber 12 and tile field 16 provide the secondary treatment of the sewage effluent from septic tank 14. An ozone generator 20 mounted on a concrete slab 21 has a compressor 22 which compresses atmospheric air and passes it through a generator cell 23 producing a corona by the silent discharge of an electric current to convert the oxygen in the air to ozone which is discharged along with the other gases in the air into contact chamber 12. Ozone generator cells are shown and described in Schaefer U.S. Pat. No. 2,403,241 and Schaefer application Ser. No. 198,937, filed Nov. 15, 1971 as a continuation of prior copending Schaefer application Ser. No. 801,674 filed Feb. 24, 1969, now abandoned, which are incorporated herein by reference and hence, need not be described in further detail. Septic tank 14 has a raw sewage inlet 24, a lid 26 with a cleanout cover 28 and sewage effluent outlet 30. Anaerobic bacteria partially reduce the raw sewage entering septic tank 14 by putrefaction. If desired, an aeration device (not shown) can be used for the primary treatment of the raw sewage rather than septic tank 14.

Contact chamber 12 is formed of an elongated plastic, cement or clay pipe 32 closed at one end and having a lip 34 at the other end receiving a lid 36. Preferably lid 36 is provided with a cleanout and viewing cover 38 preferably of a transparent sheet of plastic material such as acrylic. A silicone caulking compound 40 seals lid 36 to lip 34 and cover 38 to lid 36. An ozone diffuser 42 rests on the bottom of chamber 12 and is connected by a flexible plastic hose 44 to the ozone outlet 45 of generator 20. Diffuser 42 has a cartridge 46 of a porous material such as silicon carbide or alumina with an average pore size of 25 microns which discharges ozone into the sewage effluent in chamber 12 in the form of small bubbles. Cartridges 46 are commercially available from Carborundum Company, 11171 Lappin, Detroit, Michigan, in several different shapes and pore sizes.

Chamber 12 has an inlet pipe 48 and an outlet pipe 50. To facilitate the flow of sewage effluent through chamber 12, inlet 48 is preferably positioned slightly above outlet 50 as indicated by arrows 52 in FIG. 1. To prevent ozone from escaping into septic tank 14, inlet 48 is connected to a downpipe 54 which extends substantially below the normal level of sewage effluent in chamber 12 indicated by broken line 56 in FIG. 1. Outlet 50 is connected to an open ended pipe 58 which extends longitudinally to communicate with both the upper portion or gas zone 60 and lower portion or liquid zone 61 of chamber 12. Pipe 58 extends almost to the bottom of chamber 12 to receive sewage effluent in liquid zone 61 and to allow the sewage effluent to pass from the chamber through outlet 50. This provides a downward flow of sewage effluent in chamber 12 from pipe 54 to the lower end of pipe 58 in opposition to the upward flow of ozone from diffuser 42. This counterflow of sewage effluent and ozone increases the time during which the ozone is in contact with the sewage effluent, thereby hastening reduction of the sewage effluent by oxidation. The upper end of pipe 58 communicates with the gas zone 60 of chamber 12 to receive ozone which has passed through the sewage effluent in the chamber and to allow the ozone to pass into outlet 50. A vent pipe 62 extends through cover 36 and into chamber 12 to provide a vent allowing ozone to escape from the chamber if tile field 16 or outlet 50 becomes plugged and prevents sewage effluent from flowing out of the chamber. The lower end or inlet of vent pipe 62 is positioned to prevent ozone from escaping through vent pipe 62 during normal operation of contact chamber 12 and from passing through pipe 54 into septic tank 14 if tile field 16 or outlet 50 becomes plugged. The inlet of vent pipe 62 is positioned or located slightly below the normal level 56 of sewage effluent in chamber 12 and above the lower end of pipe 54.

As shown in FIGS. 1 and 2, sewage effluent tile field 16 has a plurality of generally parallel runs of tile 64 which are connected at the inlet end to outlet 50 of chamber 12 by elbows 66, and t's 68 and 70 and are interconnected at the other end by t's 68 and elbows 72. Vent pipes 74 are connected through elbows 72 to the far end of the runs of tile field 16 for venting the tile field to the atmosphere. Tiles 64 of each run of tile field 16 are laid with a slight gap 76 between their ends in a bed of crushed rock 78 or other porous material.

In operating treatment apparatus 10, raw sewage enters septic tank 14 through inlet 24 where anaroebic bacteria partially reduce the solid waste matter by putrefaction to provide the primary treatment of the sewage. The sewage effluent from septic tank 14 flows into contact chamber 12 where it is further processed and reduced by oxidation due to contact with ozone. Ozone produced by generator 20 passes through hose 44 and is discharged from diffuser 42 into the bottom of chamber 12. Diffuser 42 discharges the ozone in the form of small bubbles which increases the surface area of contact between the ozone and the sewage effluent, thereby hastening oxidation of the sewage effluent. The ozone passes upward through the sewage effluent into the upper portion 60 of chamber 12 while the sewage effluent passes downward from pipe 54 through chamber 12 into the lower end of pipe 58 and thence through outlet 50 into tile field 16. As previously noted, this counterflow of ozone and sewage effluent hastens oxidation of the sewage. Simultaneously, ozone from the upper portion or gas zone 60 of chamber 12 passes through the upper end of pipe 58 and through outlet 50 into tile field 16. As the sewage effluent and ozone pass through tile field 16, the sewage effluent is further processed and reduced by the action of aerobic organisms and by oxidation due to the ozone and oxygen in tile field 16 from chamber 12. The processed and substantially completely liquified sewage effluent seeps through the cracks 76 between tile 64 of field 16 into crushed rock 78 and soil 18 and the spent ozone and any gases produced by the sewage pass to the atmosphere through vent pipe 74. In coarse and uncompacted soil some of the spent ozone and gases may escape from tile field 16 to the atmosphere through cracks 76 and the loose soil. Generator 20 produces a sufficient volume of compressed air with ozone therein to provide a flow of some ozone into tile field 16 where the ozone further processes the sewage and any unspent ozone may revert to oxygen in the air which passes through vent pipe 74 to the atmosphere. Vent pipe 74 assures that the ozone and oxygen in the air from the upper portion of chamber 12 passes throughout the entire length of tile field 16 to support the growth of aerobic organisms in the tile field which reduce the sewage effluent and to further oxidize the sewage effluent in the tile field. Thus, the sewage effluent is processed in tile field 16 by aerobic organisms and oxidation while in conventional septic tank and tile field systems the sewage is processed and reduced by anaroebic bacteria.

As thus described, the use of an ozone contact chamber in conjunction with a tile field which is vented to the atmosphere at a point remote from the outlet of the contact chamber provides an apparatus for the secondary treatment of sewage effluent which eliminates offensive odors, increases the useful life of the tile field system, increases the capacity or reduces the required size of the tile field system, and is more effective, efficient and service and maintenance free than conventional septic tank tile field systems.

I claim:

1. An apparatus for secondary treatment of sewage effluent comprising:

a. a closed ozone contact chamber with a liquid zone adapted to receive liquid sewage effluent and a gas zone above the liquid zone for receiving ozone, said chamber having a sewage effluent inlet adapted to communicate with the liquid zone in normal operation of the apparatus and a fluid outlet adapted to simultaneously communicate with both the liquid zone and gas zone in normal operation of the apparatus, b. an ozone diffuser in the liquid zone of said contact chamber, said diffuser adapted to discharge ozone into liquid sewage effluent in the liquid zone of said chamber, c. a sewage effluent tile field connected to said fluid outlet of said chamber and adapted to receive both liquid sewage effluent and ozone from said chamber in normal operation of the apparatus, d. a vent connected to said tile field at a point remote from the connection of said field to said fluid outlet for allowing ozone and gases from the sewage effluent to escape from said field to the atmosphere and e. an ozone generator connected to said ozone diffuser and adapted to discharge sufficient ozone into said chamber to provide a flow of ozone into said tile field and to exhaust spent ozone to the atmosphere through said vent.

2. The apparatus of claim 1 which also comprises a septic tank having a sewage effluent outlet connected to said sewage effluent inlet of said contact chamber.

3. The apparatus of claim 1 in which said sewage effluent inlet of said contact chamber has a pipe extending downward into the liquid sewage effluent in said chamber in normal operation of the apparatus.

4. The apparatus of claim 1 in which said fluid outlet communicates with said chamber adjacent the lower end of the liquid zone to provide a generally downward flow of liquid sewage effluent through the liquid zone in opposition to the generally upward flow of ozone from said diffuser through the liquid zone, whereby the duration of the contact of ozone with sewage effluent in said chamber is increased.

5. The apparatus of claim 1 which also comprises a second vent connected to said contact chamber and having an outlet communicating with the atmosphere and an inlet communicating with the liquid zone in said chamber both below the level of the liquid sewage effluent in said chamber during normal operation of the apparatus and above the point at which said sewage inlet discharges into said chamber to provide an escape vent for the ozone in said chamber if said tile field becomes plugged.

6. The apparatus of claim 2 in which said fluid outlet communicates with said chamber adjacent the lower end of the liquid zone to provide a generally downward flow of liquid sewage effluent through the liquid zone in opposition to the generally upward flow of ozone from said diffuser through the liquid zone, whereby the duration of the contact of ozone with sewage effluent in said chamber is increased.

7. The apparatus of claim 3 in which said fluid outlet communicates with said chamber adjacent the lower end of the liquid zone to provide a generally downward flow of liquid sewage effluent through the liquid zone in opposition to the generally upward flow of ozone from said diffuser through the liquid zone, whereby the duration of the contact of ozone with sewage effluent in said chamber is increased.

* * * * *